(12) United States Patent
Kislyuk et al.

(10) Patent No.: US 9,356,941 B1
(45) Date of Patent: May 31, 2016

(54) SYSTEMS AND METHODS FOR DETECTING SUSPICIOUS WEB PAGES

(75) Inventors: Oleg Kislyuk, San Ramon, CA (US);
Maxim Gubin, Walnut Creek, CA (US);
Alex Vinnik, Austin, TX (US)

(73) Assignee: Symantec Corporation, Mountain View, CA (US)

( * ) Notice: Subject to any disclaimer, the term of this patent is extended or adjusted under 35 U.S.C. 154(b) by 960 days.

(21) Appl. No.: 12/857,119

(22) Filed: Aug. 16, 2010

(51) Int. Cl.
*G06F 15/16* (2006.01)
*H04L 29/06* (2006.01)

(52) U.S. Cl.
CPC .............. *H04L 63/14* (2013.01); *H04L 63/145* (2013.01); *H04L 63/1408* (2013.01); *H04L 63/1416* (2013.01); *H04L 63/1441* (2013.01); *H04L 63/1483* (2013.01)

(58) Field of Classification Search
CPC ... H04L 63/14; H04L 63/145; H04L 63/1408; H04L 63/1416; H04L 63/1441; H04L 63/1483
USPC .......................................................... 726/22
See application file for complete search history.

(56) References Cited

U.S. PATENT DOCUMENTS

| | | | | |
|---|---|---|---|---|
| 5,812,529 A * | 9/1998 | Czarnik et al. | ........... | 370/245 |
| 6,269,330 B1 * | 7/2001 | Cidon et al. | ........... | 714/43 |
| 6,988,209 B1 * | 1/2006 | Balasubramaniam et al. | . | 726/22 |
| 7,032,016 B2 * | 4/2006 | Cerami et al. | ........... | 709/223 |
| 7,096,498 B2 * | 8/2006 | Judge | ........... | 726/22 |
| 7,124,101 B1 * | 10/2006 | Mikurak | ........... | 705/35 |
| 7,124,438 B2 * | 10/2006 | Judge et al. | ........... | 726/22 |
| 7,213,260 B2 * | 5/2007 | Judge | ........... | 726/3 |
| 7,225,466 B2 * | 5/2007 | Judge | ........... | 726/22 |
| 7,313,691 B2 * | 12/2007 | Bantz et al. | ........... | 713/155 |
| 7,475,425 B2 * | 1/2009 | Bantz et al. | ........... | 726/22 |
| 7,530,105 B2 * | 5/2009 | Gilbert et al. | ........... | 726/22 |
| 7,617,532 B1 * | 11/2009 | Alexander et al. | ........... | 726/22 |
| 7,620,986 B1 * | 11/2009 | Jagannathan et al. | ........... | 726/22 |
| 7,693,945 B1 * | 4/2010 | Dulitz et al. | ........... | 709/206 |
| 7,899,611 B2 * | 3/2011 | Downs et al. | ........... | 701/117 |
| 7,912,628 B2 * | 3/2011 | Chapman et al. | ........... | 701/117 |
| 7,945,563 B2 * | 5/2011 | Seitz | ........... | 707/722 |
| 2002/0104014 A1 * | 8/2002 | Zobel et al. | ........... | 713/200 |
| 2004/0025044 A1 * | 2/2004 | Day | ........... | 713/200 |
| 2004/0128552 A1 * | 7/2004 | Toomey | ........... | 713/201 |
| 2005/0257261 A1 * | 11/2005 | Shraim et al. | ........... | 726/22 |
| 2005/0273856 A1 * | 12/2005 | Huddleston | ........... | 726/22 |
| 2006/0041927 A1 * | 2/2006 | Stark et al. | ........... | 725/139 |

(Continued)

OTHER PUBLICATIONS

Choi et al.; Detecting Malicious Web Links and Identifying Their Attack Types; 12 Pages.*

*Primary Examiner* — Krista Zele
*Assistant Examiner* — Anthony Fabbri
(74) *Attorney, Agent, or Firm* — ALG Intellectual Property, LLC

(57) ABSTRACT

A computer-implemented method for detecting suspicious web pages. The method may include 1) identifying a plurality of malicious web pages; 2) establishing a classification model for identifying suspicious web pages, the classification model being based at least in part on the plurality of malicious web pages; 3) identifying an additional web page; 4) classifying the additional web page as suspicious using the classification model; 5) analyzing the additional web page to determine whether the additional web page is malicious; 6) determining that the additional web page is malicious based on the analysis; and 7) updating the classification model based at least in part on the determination. Various other methods, systems, and computer-readable media are also disclosed.

20 Claims, 5 Drawing Sheets

(56) References Cited

U.S. PATENT DOCUMENTS

| | | | |
|---|---|---|---|
| 2006/0070126 A1* | 3/2006 | Grynberg | 726/22 |
| 2006/0080735 A1* | 4/2006 | Brinson et al. | 726/22 |
| 2006/0101514 A1* | 5/2006 | Milener et al. | 726/22 |
| 2006/0123478 A1* | 6/2006 | Rehfuss et al. | 726/22 |
| 2006/0156401 A1* | 7/2006 | Newstadt et al. | 726/22 |
| 2006/0179315 A1* | 8/2006 | Sasage et al. | 713/173 |
| 2006/0253458 A1* | 11/2006 | Dixon et al. | 707/10 |
| 2006/0265747 A1* | 11/2006 | Judge | 726/22 |
| 2007/0094500 A1* | 4/2007 | Shannon | G06F 21/645 713/170 |
| 2007/0294203 A1* | 12/2007 | Seitz | 707/1 |
| 2008/0010683 A1* | 1/2008 | Baddour | G06F 17/30864 726/24 |
| 2009/0044024 A1* | 2/2009 | Oberheide et al. | 713/188 |
| 2009/0300764 A1* | 12/2009 | Freeman | 726/24 |
| 2010/0037314 A1* | 2/2010 | Perdisci | H04L 63/1416 726/22 |
| 2010/0262693 A1* | 10/2010 | Stokes | H04L 63/1408 709/225 |
| 2011/0022559 A1* | 1/2011 | Andersen | G06F 21/52 706/47 |
| 2011/0314543 A1* | 12/2011 | Treit et al. | 726/23 |

\* cited by examiner

SYSTEMS AND METHODS FOR DETECTING SUSPICIOUS WEB PAGES

BACKGROUND

As the World Wide Web has matured, the number of websites hosting email, banking, ecommerce, and social networking services, as well as the number of users accessing these services, has increased. Users may be accustomed to providing these legitimate websites with confidential and/or personal information. Consequently, malicious websites posing as legitimate websites may pose a serious security threat. For example, malicious websites may be used to steal confidential information (e.g., user credentials or credit card numbers) as part of a phishing attack or may exploit vulnerabilities in web browser software that may allow malware to be downloaded to a user's computer. Furthermore, some legitimate websites (through the use of spam, comment posts, etc.) may be used to redirect users to malicious websites.

Malicious website detection may help to reduce the risk that a user will fall victim to these threats by providing a warning before the user visits a malicious website. To detect a malicious website, a typical detection system may analyze each web page contained within the malicious website. A detection system may also need to revisit many websites that are dynamic and continuously change. Similarly, malicious websites may evolve in an attempt to avoid detection. Thus, a detection system may need to continually analyze significant numbers of websites to detect any malicious websites that may be a threat to users. Unfortunately, analyzing large numbers of websites may be cost and time prohibitive. Accordingly, the instant disclosure addresses a need for systems and methods that provide malicious website detection in a more effective and efficient manner.

SUMMARY

As will be described in greater detail below, the instant disclosure generally relates to systems and methods for detecting suspicious web pages. Embodiments of the instant disclosure may implement malicious website detection by: 1) selecting suspicious web pages for further heavy analysis, 2) analyzing the suspicious web pages to determine whether the suspicious web pages are malicious, and 3) dynamically adapting, based on the analysis, to changes in malicious web page content and/or behavior. For example, a computer-implemented method for detecting suspicious web pages may include: 1) identifying a plurality of malicious web pages (e.g., a sample data set), 2) establishing a classification model for identifying suspicious web pages, the classification model being based at least in part on the plurality of malicious web pages (e.g., using the plurality of malicious web pages to train the classification model), 3) identifying an additional web page, 4) classifying the additional web page as suspicious using the classification model, 5) analyzing the additional web page to determine whether the additional web page is malicious (e.g., performing complete heavy analysis on the additional web page), 6) determining that the additional web page is malicious based on the analysis, and 7) updating the classification model based at least in part on the determination (e.g., using the additional web page to dynamically retrain the classification model).

The method may include classifying the additional web page as suspicious using the classification model based on features of the additional web page. For example, the method may include classifying the additional web page as suspicious based on one or more of the following: 1) a content feature of the additional web page (e.g., an IFRAME tag with zero size or the presence of one or more content-based n-grams), 2) a uniform resource locator (URL) feature of the additional web page (e.g., the presence of one or more URL-based n-grams or an IP address that corresponds to a URL), and/or 3) a link (e.g., a hyperlink) between the additional web page and the plurality of malicious web pages.

The method may also include maintaining a web-page link graph and may use the web-page link graph to classify the additional web page. In one example, the method may classify the additional web page as suspicious based on the link between the additional web page and the plurality of malicious web pages by: 1) identifying a set of direct links between the additional web page and the plurality of malicious web pages, 2) identifying a set of indirect links between the additional web page and the plurality of malicious web pages, 3) calculating a suspicious link score for the additional web page based on the set of direct links and the set of indirect links, 4) classifying the additional web page as suspicious based at least in part on the suspicious link score.

The method may include establishing the classification model for identifying suspicious web pages by identifying a set of classifiers (e.g., N voting large margin perceptrons), where each classifier is configured to independently classify the additional web page.

The method may include classifying the additional web page using the set of classifiers by determining, for each classifier in the set of classifiers, a classification (e.g., a probability that the additional web page is malicious) for the additional web page, and then by combining the classifications of each classifier (e.g., combining the classifications using a voting algorithm).

In some embodiments, the method may include establishing the classification model for identifying suspicious web pages by using the plurality of malicious web pages to train the classification model.

The method may also include adapting to changes in malicious web page content and behavior by retraining the classification model using a machine learning algorithm based on the determination that the additional web page is malicious. For example, the method may include updating the classification model by generating an additional classifier based at least in part on the additional web page and by adding the additional classifier to the set of classifiers. Methods disclosed herein may also periodically identify an expired classifier and remove the expired classifier from the set of classifiers.

The method may include generating the additional classifier based at least in part on the additional web page by: 1) identifying a set of newly classified malicious web pages (e.g., web pages classified as malicious during the previous day), 2) adding the additional web page to the set of newly classified malicious web pages, 3) identifying a set of malicious features, where each malicious feature comprises a feature of at least one web page in the set of newly classified malicious web pages, and 4) generating the classifier based at least in part on the set of malicious features. In one example, the set of malicious features may include at least one n-gram.

The method may include analyzing the additional web page by executing the additional web page (e.g., executing the additional web page within a virtual machine) and by detecting malicious behavior resulting from the execution of the additional web page. The method may also include determining that the additional web page is malicious based on the detection of malicious behavior.

In certain embodiments, a system for detecting suspicious web pages may include: 1) an identification module programmed to identify a plurality of malicious web pages and an additional web page, 2) an establishing module programmed to establish a classification model for identifying suspicious web pages, the classification model being based at least in part on the plurality of malicious web pages, 3) a classification module programmed to classify the additional web page as suspicious using the classification model, 4) an analyzation module programmed to analyze the additional web page to determine whether the additional web page is malicious, 5) a determination module programmed to determine that the additional web page is malicious based on the analysis, and 6) an updating module programmed to update the classification model based at least in part on the determination.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
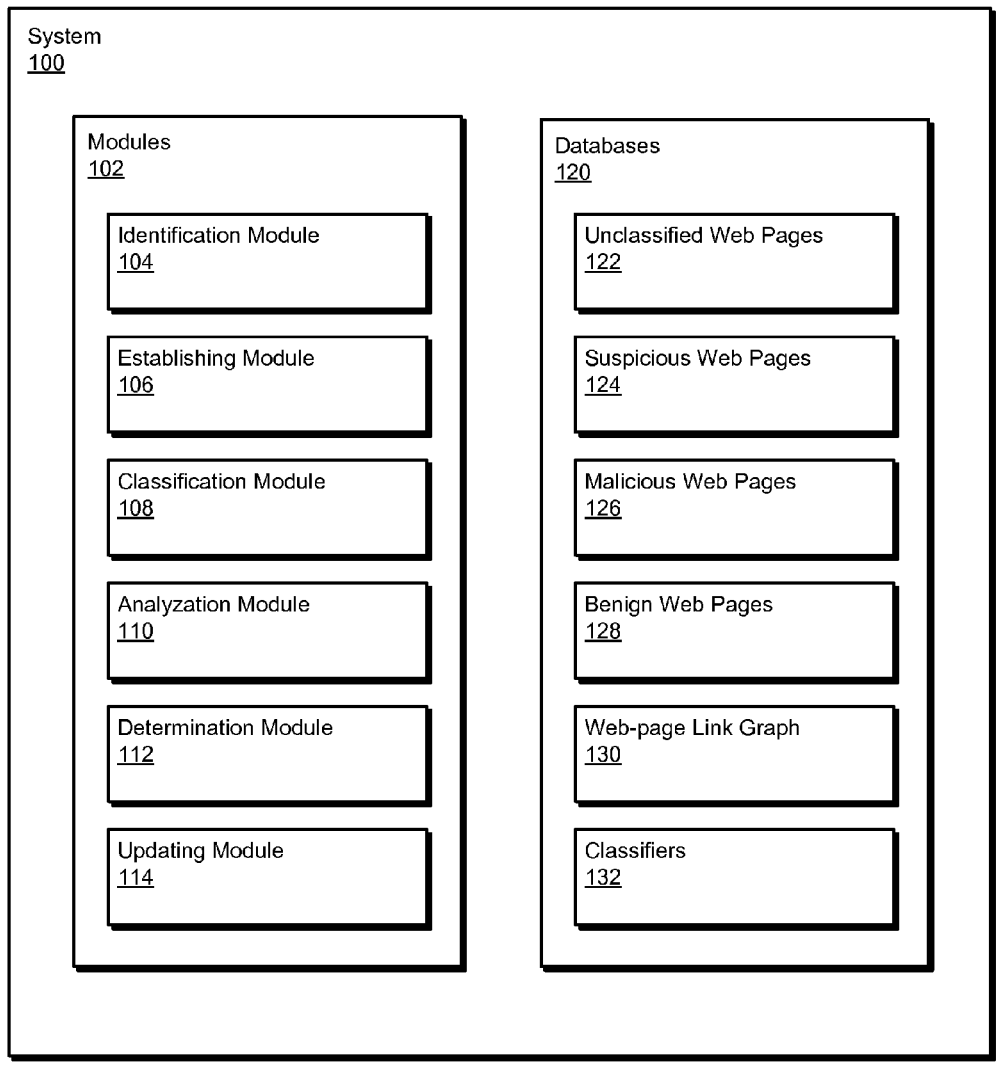
FIG. 1 is a block diagram of an exemplary system for detecting suspicious web pages.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for detecting suspicious web pages. Embodiments of the instant disclosure may improve malicious website detection by: 1) selecting suspicious web pages for further heavy analysis, 2) analyzing the suspicious web pages to determine whether the suspicious web pages are malicious, and 3) dynamically adapting, based on the analysis, to changes in malicious web page content and/or behavior. Thus, embodiments of the instant disclosure may conserve system resources by selectively applying heavy analysis and effectively adapting the process of selecting web pages for heavy analysis. Embodiments of the instant disclosure may also provide various other advantages and features, as discussed in greater detail below.

Figure 2:
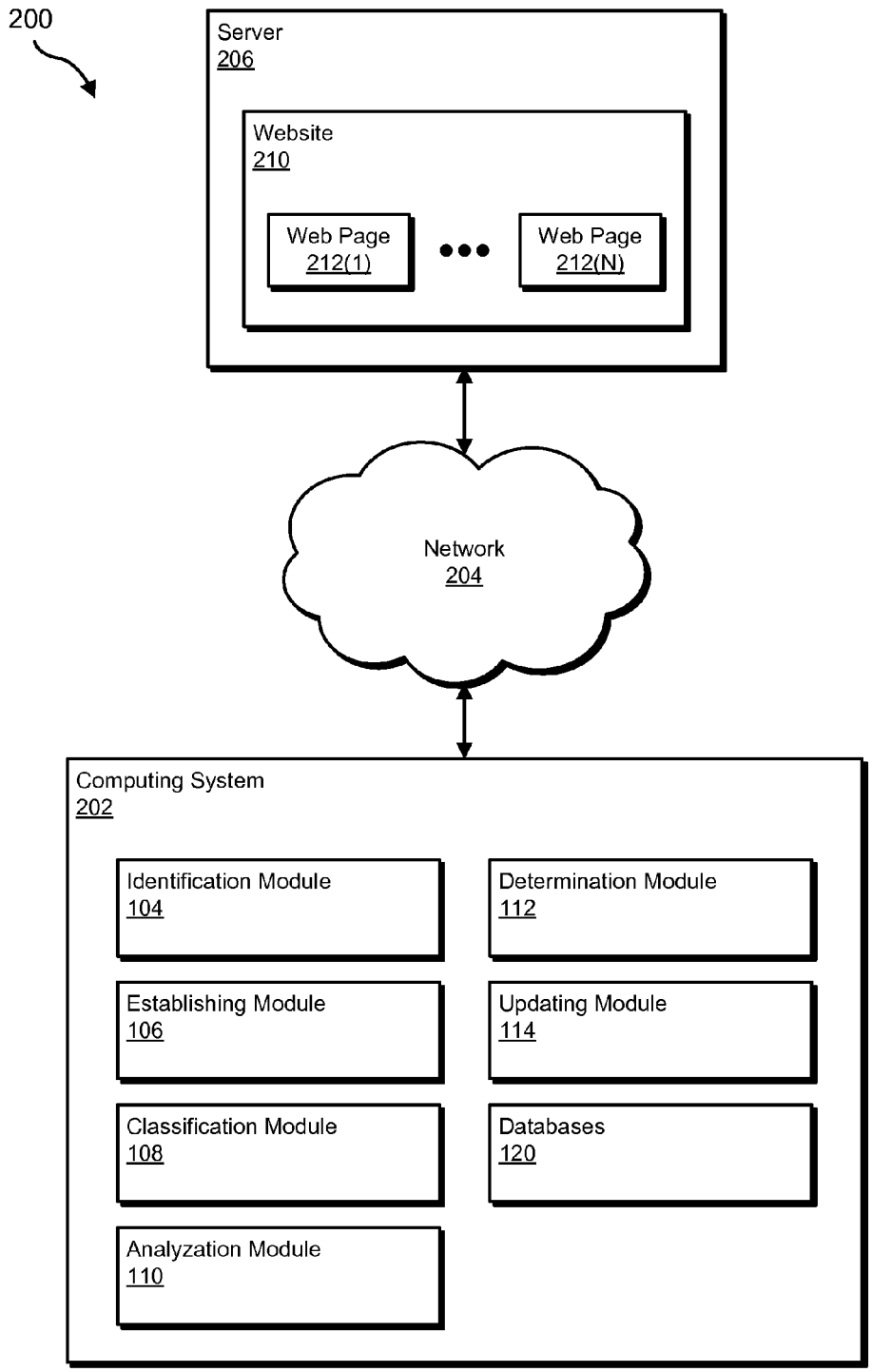
FIG. 2 is a block diagram of another exemplary system for detecting suspicious web pages.

The following will provide, with reference to FIGS. 1-2, detailed descriptions of exemplary systems for detecting suspicious web pages. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for detecting suspicious web pages. As illustrated in this figure, exemplary system 100 may include one or more modules 102 for performing one or more tasks. For example, and as will be explained in greater detail below, exemplary system 100 may include an identification module 104 programmed to identify a plurality of malicious web pages and an additional web page. Exemplary system 100 may also include an establishing module 106 programmed to establish a classification model for identifying suspicious web pages. The classification model may be based, at least in part, on the plurality of malicious web pages. Exemplary system 100 may also include a classification module 108 programmed to classify the additional web page as suspicious using the classification model. Exemplary system 100 may also include an analyzation module 110 programmed to analyze the additional web page to determine whether the additional web page is malicious. Exemplary system 100 may also include a determination module 112 programmed to determine that the additional web page is malicious based on the analysis. Exemplary system 100 may also include an updating module 114 programmed to update the classification model based at least in part on the determination. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include an unclassified web pages database 122 for storing unclassified web pages and/or information identifying unclassified web pages. Exemplary system 100 may also include a suspicious web pages database 124 for storing suspicious web pages and/or information identifying suspicious web pages.

Exemplary system 100 may include a malicious web pages database 126 for storing malicious web pages and/or information identifying malicious web pages. Exemplary system 100 may also include a benign web pages database 128 for storing benign web pages and/or information identifying benign web pages. Exemplary system 100 may further include a web-page link graph database 130 for storing a web-page link graph. Exemplary system 100 may also include a classifiers database 132 for storing classifiers.

Databases 120 in FIG. 1 may represent a portion of one or more computing devices. For example, databases 120 may represent a portion of computing system 202 in FIG. 2, computing system 410 in FIG. 4, and/or portions of exemplary network architecture 500 in FIG. 5. Alternatively, databases 120 in FIG. 1 may represent one or more physically separate devices capable of being accessed by a computing device, such as computing system 202 in FIG. 2, computing system 410 in FIG. 4 and/or portions of exemplary network architecture 500 in FIG. 5.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with a server 206 (e.g., a web server hosting one or more websites) via a network 204. In one embodiment, and as will be described in greater detail below, computing system 202 may be programmed to detect suspicious web pages contained within a website (e.g., website 210 hosted on web server 206 and containing web pages 212(1)-212(N)).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, application servers and database servers configured to provide various database services and/or run certain software applications, combinations of one or more of the same, exemplary computing system 410 in FIG. 4, or any other suitable computing device. As shown in FIG. 2, computing system 202 may also include identification module 104, establishing module 106, classification module 108, analyzation module 110, determination module 112, updating module 114, and databases 120.

Computing system 202 may communicate with server 206 over network 204. Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 500 in FIG. 5, or the like. Network 204 may facilitate communication or data transfer using wireless or wired connections. In one embodiment, network 204 may facilitate communication between computing system 202 and server 206.

Figure 3:
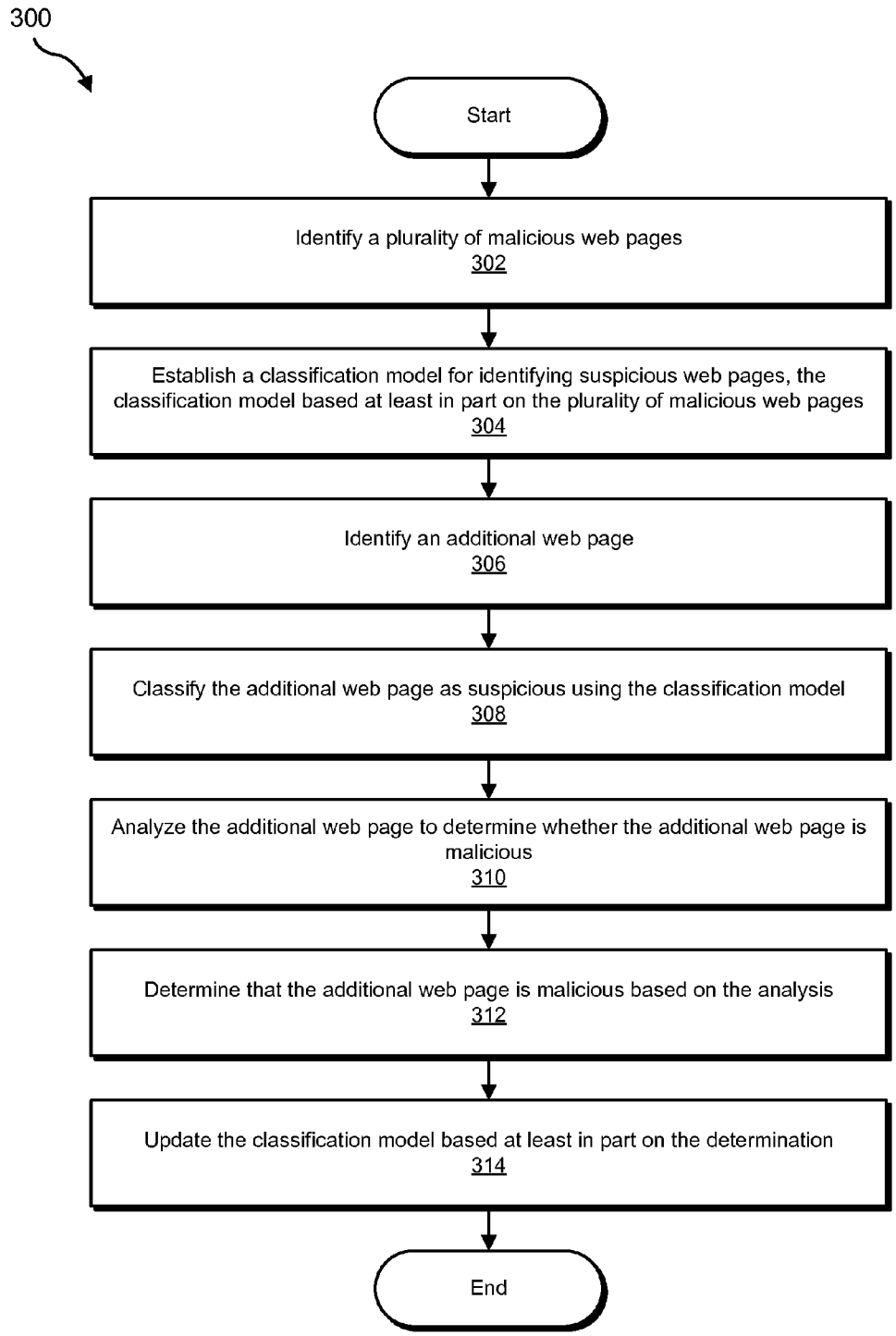
FIG. 3 is a flow diagram of an exemplary method for detecting suspicious web pages.

FIG. 3 is a flow diagram of an exemplary computer-implemented method 300 for detecting suspicious web pages. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302, one or more of the systems described herein may identify a plurality of malicious web pages. For example, identification module 104, as part of computing system 202, may select one or more of malicious web pages 126 (i.e., web pages that have already been identified as being malicious). As described in greater detail below, the plurality of malicious web pages may be used as a sample set for establishing a classification model for suspicious web pages.

As used herein, the phrase "web page" may refer to any document or resource that may be viewed using a web browser. In some instances, a web browser may utilize a browser plug-in or add-on to render the web page. The term "web page" may also refer to a computer file containing the web page, a uniform resource locator (URL) that references the web page, a rendered representation of the web page, and/or any other suitable representation of the web page. For example, a web page may include a text file, located on a server (e.g., server 206), that is formatted using a markup language (e.g., HyperText Markup Language (HTML) or Extensible Hypertext Markup Language (XHTML)), and may include, without limitation, text, images, scripts (e.g., scripts written using JavaScript or Jscript), controls (e.g., ActiveX controls), files and/or hypertext links.

As used herein, the phrase "malicious web page" may refer to any web page that has been determined to be malicious. Examples of malicious web pages may include, without limitation, web pages that steal confidential information (e.g., user credentials or credit card numbers) as part of a phishing attack, exploit vulnerabilities in web browser software that may allow malware to be downloaded to a user's computer, or entice a user to download malware.

Identification module 104 may identify the plurality of malicious web pages in a variety of ways. In one example, identification module 104 may identify the plurality of malicious web pages as part of identifying a sample data set to be used in training a classification model. For example, identification module 104 may identify a sample data set that includes the plurality of malicious web pages and/or a plurality of benign web pages (e.g., one or more of benign web pages 128).

Returning to FIG. 3, at step 304, one or more of the systems described herein may establish a classification model for identifying suspicious web pages. The classification model may be based, at least in part, on the plurality of malicious web pages. For example, establishing module 106, as part of computing system 202, may establish the classification model by training the classification model on one or more of the plurality of malicious web pages.

As used herein, the term "suspicious" may refer to potential maliciousness, a probability of maliciousness, or a classification (e.g., a web page may be classified as suspicious, malicious, or benign). For example, a web page with a low probability of maliciousness may be less suspicious than a web page with a high probability of maliciousness.

As used herein, the term "classification model" may refer to any algorithm, heuristic, data, or combination thereof, used to identify suspicious web pages. For example, a classification model used to identify suspicious web pages may include a data mining algorithm, a machine learning algorithm, sample data, a classification algorithm, and/or a web-page link graph.

Establishing module 106 may establish the classification model in a variety of ways. For example, establishing module 106 may establish the classification model by identifying, creating, training, maintaining, and/or updating all or a portion of the classification model. In one example, establishing module 106 may establish the classification model by identifying a set of classifiers (e.g., selecting one or more of classifiers 132), where each classifier is configured to independently classify additional web pages (i.e., web pages to be analyzed using the classification model). As used herein, the term "classifier" may refer to any algorithm or heuristic used to classify web pages as suspicious. Examples of classifiers may include, without limitation, a linear classifier, a non-linear classifier, a perceptron, a naive Bayes classifier, a support vector machine, a neural network, a decision tree, and/or any other suitable classification algorithm. In one example, the set of classifiers may include N voting large margin perceptrons.

In one example, the classification model may use features that indicate potentially malicious web pages to identify suspicious web pages. For example, establishing module 106 may establish the classification model by: 1) identifying one or more features that best predict maliciousness and/or suspiciousness, 2) determining, for each web page in a sample data set (e.g., the previously identified malicious web pages), a value for each feature, and 3) training the classification model based on the determined feature values.

As used herein the term "feature" may refer to any characteristic, attribute, or property of a web page, or a specific value thereof. Examples of features may include, without limitation, a content feature, a uniform resource locator feature, or a link feature.

As used herein, the phrase "content feature" generally refers to any feature based on content (e.g., text, HTML, or binary content) of a web page. Examples of content features may include, without limitation, HTML content containing a predefined string or declaration (e.g., "CLASSID", "CREATEOBJECT", or "ACTIVEXOBJECT"); HTML content containing an IFRAME with zero size; HTML content with an unescaped token and a long string (e.g., a string of 30 characters or more) of escaped hexadecimal numbers (e.g., %01%AB %1B . . . % F0) or a long string comprised of Latin alphabet characters; HTML content containing a token (e.g., "REVERSE" or "DOCUMENT.WRITE") and a long string of escaped hexadecimal numbers or a long string comprised of Latin alphabet characters; HTML content containing a predefined string (e.g., "EVAL") and a long string of escaped hexadecimal numbers, a long string comprised of Latin alphabet characters, or a long string of comma separated hexadecimal numbers (e.g., 0FA,56,AA, . . . , 0FF); HTML content containing a predefined token (e.g., "arguments.callee.toString"); HTML content containing a predefined token (e.g., "document.write") and a long string comprising hexadecimal numbers separated by a non hexadecimal symbol (e.g., 0FF!14888?FA01[67F]67A} . . . *FF0); HTML content containing a string longer than 50 hexadecimal symbols; text content containing a n-gram (e.g., a 4-gram); or text content containing a number of occurrences of a n-gram.

As used herein the phrase "uniform resource locator feature" may refer to any feature based on a uniform resource locator (URL) of a web page or URLs contained within a web page. Examples of a uniform resource locator feature may include, without limitation, an external feed URL (e.g., a URL contained within a web page that references an external feed), a URL suspiciousness score calculated based on the way a URL is composed, a top URL suspiciousness score determined by calculating a URL suspiciousness score for each URL contained within a web page, a URL containing a n-gram, and/or an IP address corresponding to a URL.

As used herein a "link feature" may refer to any feature based on links contained within a web page or links referencing a web page. As used herein, the term "link" may refer any connection between two web pages. For example, a link may be based on a hyperlink (e.g., an inlink or an outlink) or URL contained within one or more web pages. Examples of link features may include, without limitation, a suspicious link score calculated using a web-page link graph and/or a top suspicious link score determined by calculating a suspicious link score for all links contained within a web page.

In some embodiments, establishing module 106 may automatically identify features by analyzing, using a suitable data mining or pattern recognition algorithm, a sample data set comprising one or more web pages (e.g., one or more of the plurality of malicious web pages). For example, establishing module 106 may analyze n-grams extracted from each web page in the sample data set and may identify one or more n-grams that may be used to predict maliciousness and/or suspiciousness. In another example, establishing module 106 may identify one or more manually identified features.

After identifying one or more features that may be used to identify suspicious web pages, establishing module 106 may determine, for each web page in a sample data set, a value for each feature. For example, establishing module 106 may determine, for each web page in the plurality of malicious web pages, a value for each feature used by the classification model.

In one example, establishing module 106 may extract one or more n-grams from text or binary content of a web page. As used herein the term "n-gram" may refer to any subsequence of N items (e.g., words or characters) extracted from a web page. In one example, establishing module 106 may automatically identify one or more 4-grams contained within the web page. In another example, establishing module 106 may determine features using one or more manually constructed regular expressions.

In another example, establishing module 106 may determine link features by maintaining a web-page link graph (e.g., web-page link graph 130). The web-page link graph may include a link graph (e.g., a directed link graph) containing one or more nodes, with each node representing a single web page. The web-page link graph may also include one or more edges, with each edge joining two nodes and representing a link between web pages. In one example, the web-page link graph may contain all or a portion of all identified web pages (e.g., web pages contained in unclassified web pages 122, suspicious web pages 124, malicious web pages 126, and benign web pages 128).

Establishing module 106 may maintain the web-page link graph by: 1) adding new nodes and edges to the web-page link graph as new web pages are identified, 2) calculating suspicious link scores for each node in the web-page link graph, 3) deleting nodes and edges from the web-page link graph (e.g., deleting nodes with low suspicious link scores), and/or 4) updating the web-page link graph (e.g., periodically visiting a web page contained within the web-page link graph and verifying its links).

In one example, establishing module 106 may calculate a suspicious link score for each web page contained within the web-page link graph. A suspicious link score may be based on a link between a web page and the plurality of malicious web pages. In one example, a suspicious link score may represent a probability of maliciousness based on links. For example, a web page that has one or more hyperlinks to malicious web pages may have a higher probability of being malicious than a web page that contains no such hyperlinks. In another example, a suspicious link score may represent the probability that a user viewing a web page will arrive at a malicious web page by following hyperlinks contained within the web page.

In one example, establishing module 106 may determine the suspicious link score based on a link between a web page and the plurality of malicious web pages by: 1) identifying a set of direct links between the web page and the plurality of malicious web pages, 2) identifying a set of indirect links between the web page and the plurality of malicious web pages, and 3) calculating a suspicious link score for the web page based on the set of direct links and the set of indirect links.

As used herein, the term "direct link" may refer to any direct connection between two web pages. For example, a direct link between two web pages may include a hyperlink contained in one web page that references the other web page. Establishing module 106 may identify a direct link between a web page and the plurality of malicious web pages using the web-page link graph by identifying a path, containing no intermediate nodes, between a node representing the web page and one or more nodes representing the plurality of malicious web pages.

As used herein, the term "indirect link" may refer to any indirect connection between two web pages. For example, an indirect link between two pages may include a hyperlink contained in one web page that references an intermediate web page that contains a hyperlink to the other web page. Establishing module 106 may identify an indirect link between a web page and a malicious web page using the web-page link graph by identifying a path with one or more intermediate nodes between a node representing the web page and a node representing the malicious web page.

Establishing module 106 may calculate the suspicious link scores using any suitable link analysis algorithm (e.g., an algorithm similar to the PageRank algorithm). For example, establishing module 106 may initially set the suspicious link score of nodes in the graph representing known malicious web pages to one and may set the suspicious link score of nodes representing all other web pages to zero. Using an iterative process, establishing module 106 may calculate a new suspicious link score for each node by propagating suspicious link scores in the direction opposite the direction of links.

After determining one or more feature values of malicious web pages and/or other web pages, establishing module 106 may establish the classification model by using the feature values to train the classification model. Establishing module 106 may train the classification model in a variety of ways. For example, establishing module 106 may train the classification model using any suitable machine learning algorithm or heuristic. In one example, establishing module 106 may train each classifier in a set of classifiers using feature values from web pages contained in one or more sample data sets.

Establishing module 106 may also maintain the classification model. For example, establishing module 106 may periodically identify an expired classifier and remove the expired classifier from the set of classifiers. In one example, establishing module 106 may identify and remove the expired classifier after a predefined period of time or after the occurrence of an event that causes the expiration of a classifier. For example, after a new classifier is added to the set of classifiers, as part of step 314, the oldest classifier may expire, after which establishing module 106 may identify and remove the oldest classifier.

Returning to FIG. 3, at step 306, one or more of the systems described herein may identify an additional web page. For example, identification module 104, as part of computing system 202, may identify one of unclassified web pages 122. Identification module 104 may identify the additional web page in a variety of ways. In one example, identification module 104 may identify the additional web page by downloading the additional web page while crawling a website. For example, identification module 104 may identify web page 212(1) while crawling website 210 hosted on server 206. In one example, identification module 104 may identify web page 212(1) by: 1) identifying a uniform resource locator referencing web page 212(1), 2) downloading, from server 206, the web page file referenced by the URL, 3) storing the web page file and the URL in unclassified web pages 122, and 4) adding web page 212(1) and all links contained within web page 212(1) to web-page link graph 130.

Identification module 104 may also prepare the additional web page to be classified. For example, identification module 104 may identify the additional web page by determining values for features of the additional web page that may be used by the classification model to classify the additional web page. For example, identification module 104 may determine the presence or absence of one or more features. In one example, identification module 104 may extract features of the additional web page used to classify the additional web page. In some embodiments, identification module 104 may automatically identify one or more n-grams contained within the additional web page.

Returning to FIG. 3, at step 308, one or more of the systems described herein may classify the additional web page as suspicious using the classification model. For example, classification module 108 may classify the additional web page as suspicious using the classification model and may add the additional web page to suspicious web pages 124. Classification module 108 may classify the additional web page in a variety of ways. For example, classification module 108 may classify the additional web page by determining a classification (e.g., suspicious or benign), a probability of maliciousness, and/or a score indicating suspiciousness for the additional web page using any suitable classification algorithm and/or heuristic. Further, classification module 108 may identify and classify any number of additional (i.e., unclassified) web pages.

In one example, classification module 108 may classify the additional web page based on one or more features of the additional web page. For example, classification module 108 may classify the additional web page as suspicious based on at least one of the following: 1) a content feature of the additional web page, 2) a uniform resource locator feature of the additional web page, and/or 3) a link between the additional web page and the plurality of malicious web pages.

Classification module 108 may classify the additional web page based on one or more features of the web page in a variety of ways. For example, classification module 108 may classify the additional web page using a classification model that takes as inputs one or more feature values and outputs a classification for the additional web page.

In one example, classification module 108 may classify the additional web page as suspicious based on the link between the additional web page and the plurality of malicious web pages by: 1) identifying a set of direct links between the additional web page and the plurality of malicious web pages, 2) identifying a set of indirect links between the additional web page and the plurality of malicious web pages, 3) calculating a suspicious link score for the additional web page based on the set of direct links and the set of indirect links, and 4) classifying the additional web page as suspicious based at least in part on the suspicious link score (e.g., using the suspicious link score as a feature used to classify the additional web page).

In another example, where the classification model includes a set of classifiers (e.g., N voting large margin perceptrons), classification module 108 may classify the additional web page by: 1) determining, for each classifier in the set of classifiers, a classification (e.g., a probability that the additional web page is malicious) for the additional web page, and then by combining the classifications of each classifier (e.g., combining the classifications using any suitable voting algorithm).

In one example, each classifier in the set of classifiers may be assigned a weighting factor. For example, the weighting factor may be associated with the age of the classifier or the performance of the classifier. Classification module 108 may apply the weighting factor prior to combining the classifications of each classifier.

In another example, classification module 118 may classify the additional web page as suspicious by determining a score for all web pages contained within a website and then classifying the web pages with the highest scores as suspicious. For example, classification module 108 may determine a score for web pages 212(1)-212(N) and may classify the web pages with the highest scores as suspicious.

Returning to FIG. 3, at step 310, one or more of the systems described herein may analyze the additional web page to determine whether the additional web page is malicious. For example, analyzation module 110 may analyze the additional web page. Analyzation module 110 may analyze the additional web page in a variety of ways. In one example, analyzation module 110 may analyze the additional web page by performing heavy analysis on the additional web page. For example, analyzation module 110 may establish one or more monitored computer environments (e.g., a monitored virtual machine) that may allow the detection of malicious behavior of the additional web page. In one example, the monitored computer environment may include a web browser that may enable the additional web page to be executed. Analyzation module 110 may analyze the additional web page by executing the additional web page and detecting malicious behavior resulting from the execution of the additional web page. For example, analyzation module 110 may execute the additional web page by opening, loading or rendering the additional web page using a web browser. Additionally or alternatively, analyzation module 110 may analyze the additional web page by scanning the web page to determine whether the web page includes any malicious content and/or code.

Returning to FIG. 3, at step 312, one or more of the systems described herein may determine that the additional web page is malicious based on the analysis. For example, determination module 112 may determine that the additional web page is malicious. Determination module 112 may determine that the additional web page is malicious in a variety of ways. In one example, determination module 112 may determine that the additional web page is malicious based on malicious behavior detected as part of step 310 and may add the additional web page to malicious web pages 126.

Returning to FIG. 3, at step 314, one or more of the systems described herein may update the classification model based at least in part on the determination. For example, updating module 114 may update the classification model based on the additional web page. Updating the classification model based on the additional web page may enable the classification model to adapt to changes in malicious web page content and/or behavior.

Updating module 114 may update the classification model in a variety of ways. In one example, updating module 114 may retrain the classification model using any suitable machine learning algorithm or heuristic. For example, updating module 114 may update the classification model by: 1) generating an additional classifier based at least in part on the additional web page and 2) adding the additional classifier to the set of classifiers (e.g., adding the additional classifier to classifiers 132).

In another example, updating module 114 may dynamically retrain the classification model based on one or more newly classified malicious web pages. For example, updating module 114 may generate an additional classifier by: 1) identifying a set of newly classified malicious web pages, 2) adding the additional web page to the set of newly classified malicious web pages, 3) identifying a set of malicious features, where each malicious feature comprises a feature of at least one web page in the set of newly classified malicious web pages, 4) generating the classifier based at least in part on the set of malicious features (e.g., training the additional classifier based on the set of malicious features). In one example, the set of malicious features may include at least one n-gram.

Updating module 114 may update the classification model at a variety of intervals. In one example, updating module 114 may update the classification model daily. Updating module 114 may also update the classification by expiring one or more classifiers contained within the set of classifiers.

Figure 4:
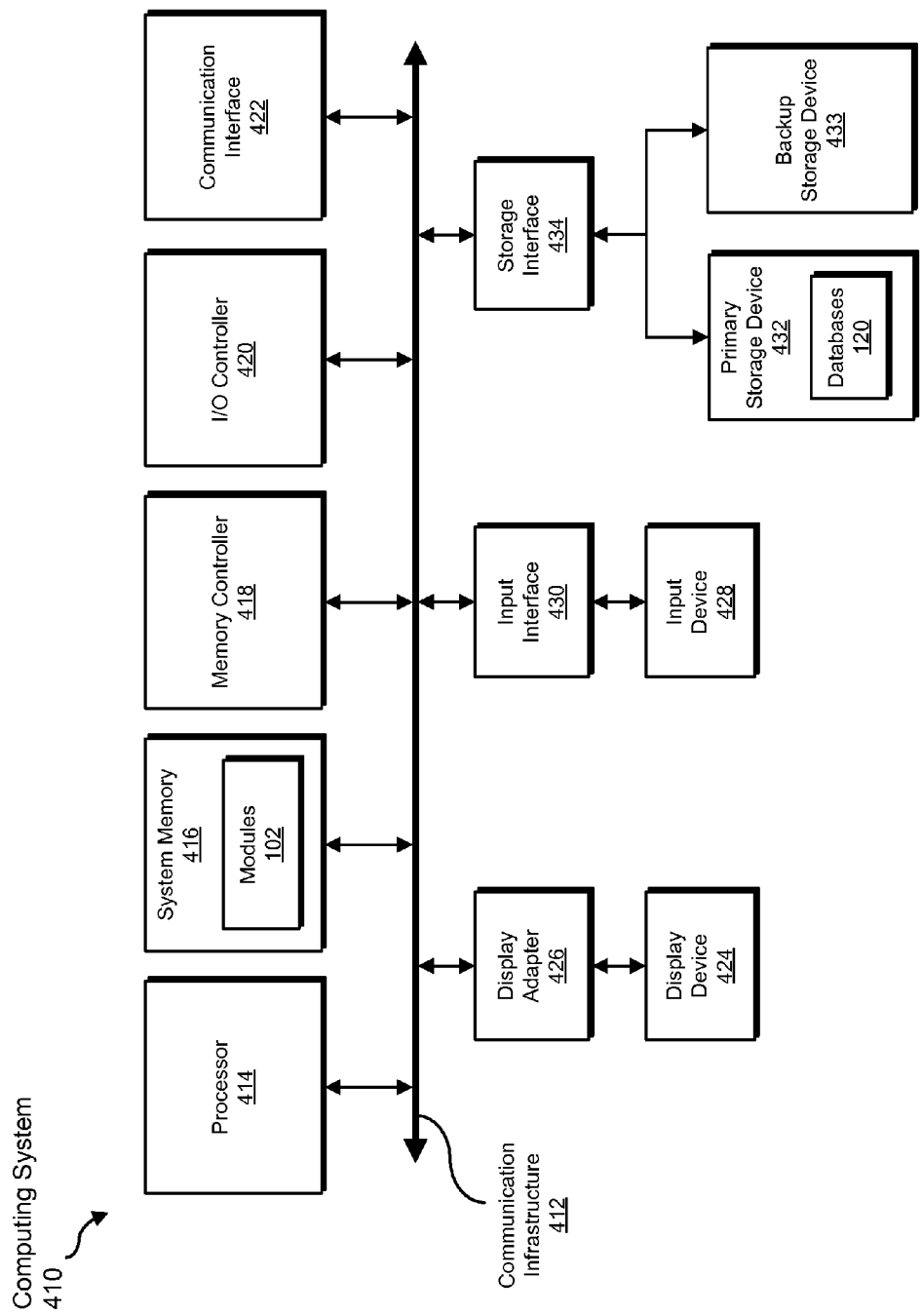
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the detecting, identifying, establishing, classifying, analyzing, determining, updating, using, calculating, combining, generating, adding, removing, and/or executing steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as detecting, identifying, establishing, classifying, analyzing, determining, updating, using, calculating, combining, generating, adding, removing, and/or executing.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the detecting, identifying, establishing, classifying, analyzing, determining, updating, using, calculating, combining, generating, adding, removing, and/or executing steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the detecting, identifying, establishing, classifying, analyzing, determining, updating, using, calculating, combining, generating, adding, removing, and/or executing steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the detecting, identifying, establishing, classifying, analyzing, determining, updating, using, calculating, combining, generating, adding, removing, and/or executing steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. In one example, databases 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the detecting, identifying, establishing, classifying, analyzing, determining, updating, using, calculating, combining, generating, adding, removing, and/or executing steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
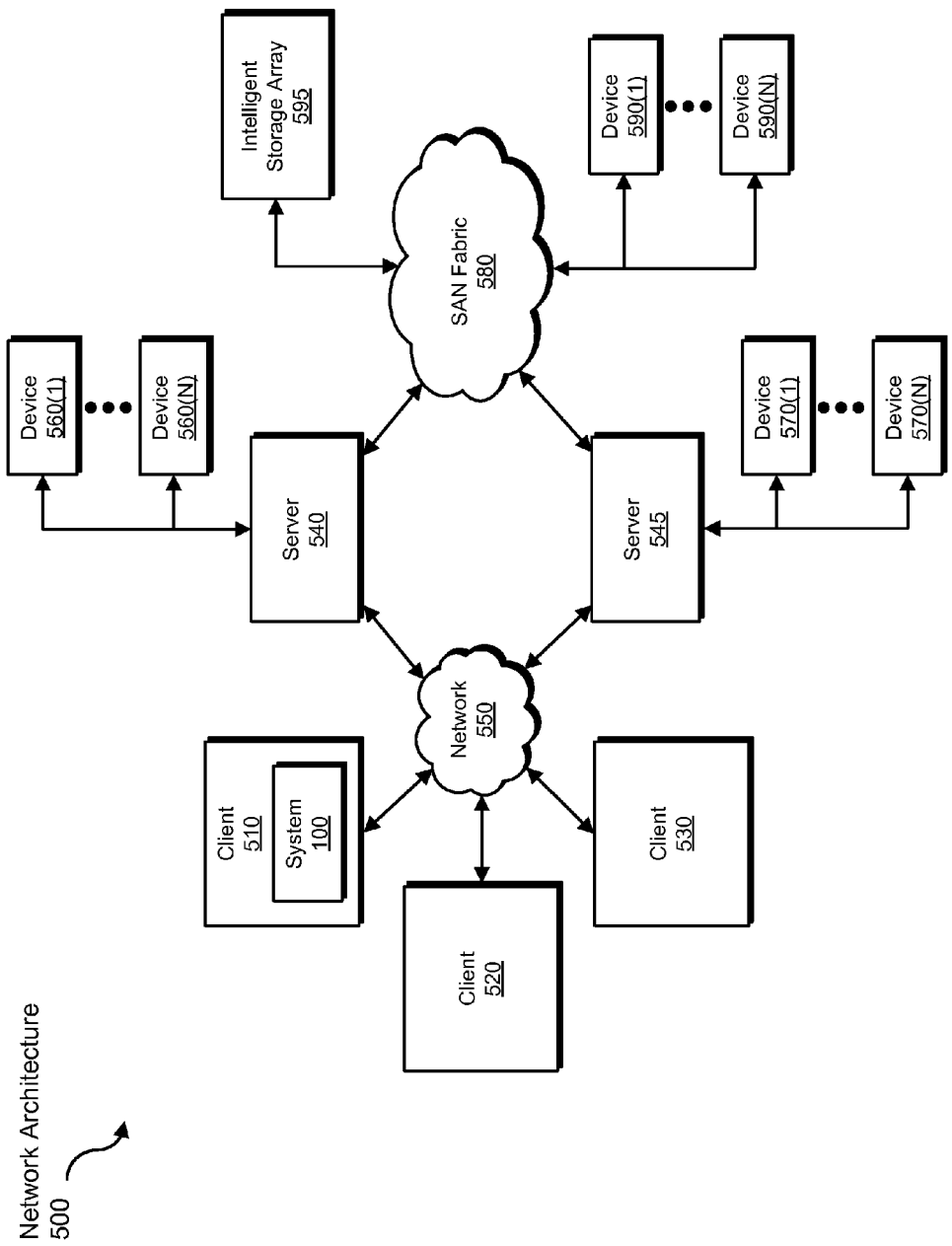
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. In one example, client system 510 may include system 100 from FIG. 1.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the detecting, identifying, establishing, classifying, analyzing, determining, updating, using, calculating, combining, generating, adding, removing, and/or executing steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for detecting suspicious web pages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, establishing module 106 transform a classification model for identifying suspicious web pages by using a plurality of malicious web pages to train the classification model.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting suspicious web pages, at least a portion of the method being performed by a computing device comprising at least one processor, the method comprising:
   identifying a plurality of malicious web pages;
   training a classification model for identifying suspicious web pages that comprises one or more classification algorithms using:
      features of the plurality of malicious web pages;
      features of a web-page link graph that comprises at least:
         a plurality of nodes, wherein each node within the plurality of nodes represents one of the plurality of malicious web pages;
         a plurality of edges that join the plurality of nodes and that represent links between web pages represented within the web-page link graph, wherein the one or more classification algorithms are configured to classify web pages as suspicious;
   identifying a website after the classification model has been trained;
   classifying a first web page of the website and a second web page of the website as suspicious using the classification model;
   determining that a probability of maliciousness of the first web page is greater than a probability of maliciousness of the second web page;
   in response to classifying the first web page and the second web page as suspicious and based at least in part on the probability of maliciousness of the first web page being greater than the probability of maliciousness of the second web page:
      selectively applying heavy analysis to the first web page and the second web page in order to conserve system resources of a monitored computer environment by:
         executing the first web page within the monitored computer environment to determine whether the first web page is malicious;
         refraining from executing the second web page within the monitored computer environment to determine whether the second web page is malicious;
      detecting a malicious behavior of the first web page resulting from executing the first web page;
      classifying the website as malicious based on detecting the malicious behavior of the first web page;
      when the website is classified as malicious, updating the classification model by updating the web-page link graph and the one or more classification algorithms based at least in part on the website having been classified as malicious.

2. The computer-implemented method of claim 1, wherein classifying the first web page as suspicious using the classification model comprises classifying the first web page as suspicious based on at least one of the following:
   a content feature of the first web page;
   a uniform resource locator feature of the first web page;
   a link between the first web page and the plurality of malicious web pages, wherein the link is represented by an edge within the web-page link graph.

3. The computer-implemented method of claim 2, wherein:
   classifying the first web page as suspicious using the classification model comprises classifying the first web page as suspicious based on the link between the first web page and the plurality of malicious web pages;
   classifying the first web page as suspicious based on the link between the first web page and the plurality of malicious web pages comprises:
      using the web-page link graph to identify a set of direct links between the first web page and the plurality of malicious web pages;
      using the web-page link graph to identify a set of indirect links between the first web page and the plurality of malicious web pages;
      calculating a suspicious link score for the first web page based on the set of direct links and the set of indirect links;
      classifying the first web page as suspicious based at least in part on the suspicious link score.

4. The computer-implemented method of claim 1, wherein:
   the one or more classification algorithms comprise a set of classifiers;

training the classification model for identifying suspicious web pages comprises training the set of classifiers, wherein each classifier in the set of classifiers is configured to independently classify the first web page.

5. The computer-implemented method of claim 4, wherein classifying the first web page as suspicious using the classification model comprises:
   determining, for each classifier in the set of classifiers, a classification for the first web page;
   combining the classifications of each classifier in the set of classifiers.

6. The computer-implemented method of claim 5, wherein updating the one or more classification algorithms comprises:
   generating an additional classifier based at least in part on the first web page and the web-page link graph;
   adding the additional classifier to the set of classifiers.

7. The computer-implemented method of claim 6, wherein generating the additional classifier based at least in part on the first web page comprises:
   identifying a set of newly classified malicious web pages;
   adding the first web page to the set of newly classified malicious web pages;
   identifying a set of malicious features, wherein each malicious feature in the set of malicious features comprises a feature of at least one web page in the set of newly classified malicious web pages;
   generating the additional classifier based at least in part on the set of malicious features.

8. The computer-implemented method of claim 4, further comprising:
   periodically identifying an expired classifier;
   removing the expired classifier from the set of classifiers.

9. The computer-implemented method of claim 1, wherein updating the one or more classification algorithms comprises adapting at least one of the one or more classification algorithms based at least in part on the first web page.

10. The computer-implemented method of claim 1, wherein:
   training the classification model for identifying suspicious web pages comprises configuring the classification model to determine the probability that the first web page is malicious;
   classifying the first web page as suspicious using the classification model comprises using the classification model to determine that the probability that the first web page is malicious is above a predetermined threshold.

11. The computer-implemented method of claim 1, wherein updating the one or more classification algorithms comprises using the first web page to retrain at least one of the one or more classification algorithms.

12. The computer-implemented method of claim 1, further comprising classifying the first web page as malicious based on detecting the malicious behavior.

13. The computer-implemented method of claim 1, wherein identifying the website comprises:
   crawling the website;
   adding an additional node to the web-page link graph for each web page of the website;
   adding an additional edge to the web-page link graph for each link between a web page of the website and a web page in the plurality of malicious web pages.

14. A system for detecting suspicious web pages, the system comprising:
   an identification module programmed to identify a plurality of malicious web pages;
   an establishing module programmed to train a classification model for identifying suspicious web pages that comprises one or more classification algorithms using:
      features of the plurality of malicious web pages;
      features of a web-page link graph that comprises at least:
         a plurality of nodes, wherein each node within the plurality of nodes represents one of the plurality of malicious web pages;
         a plurality of edges that join the plurality of nodes and that represent links between web pages represented within the web-page link graph, wherein:
            the one or more classification algorithms are configured to classify web pages as suspicious;
            the identification module is further programmed to identify, after the classification model has been trained, a website;
   a classification module programmed to classify a first web page of the website and a second web page of the website as suspicious using the classification model;
   an analyzation module programmed to:
      determine, when the first web page and the second web page are classified as suspicious, that a probability of maliciousness of the first web page is greater than a probability of maliciousness of the second web page;
      selectively apply, based at least in part on the probability of maliciousness of the first web page being greater than the probability of maliciousness of the second web page, heavy analysis to the first web page and the second web page in order to conserve system resources of a monitored computer environment by:
         executing the first web page within the monitored computer environment to determine whether the first web page is malicious;
         refraining from executing the second web page within the monitored computer environment to determine whether the second web page is malicious;
      detect a malicious behavior of the first web page resulting from executing the first web page;
   a determination module programmed to classify the website as malicious based on the detected malicious behavior;
      an updating module programmed to update, when the website is classified as malicious, the classification model by updating the web-page link graph and the one or more classification algorithms based at least in part on the website having been classified as malicious;
   at least one hardware processor configured to execute the identification module, the establishing module, the classification module, the analyzation module, the determination module, and the updating module.

15. The system of claim 14, wherein the classification module classifies the first web page as suspicious using the classification model by classifying the first web page as suspicious based on at least one of the following:
   a content feature of the first web page;
   a uniform resource locator feature of the first web page;
   a link between the first web page and the plurality of malicious web pages, wherein the link is represented by an edge within the web-page link graph.

16. The system of claim 15, wherein:
   the classification module classifies the first web page as suspicious using the classification model by classifying the first web page as suspicious based on the link between the first web page and the plurality of malicious web pages;

the classification module classifies the first web page as suspicious based on the link between the first web page and the plurality of malicious web pages by:
- using the web-page link graph to identify a set of direct links between the first web page and the plurality of malicious web pages;
- using the web-page link graph to identify a set of indirect links between the first web page and the plurality of malicious web pages;
- calculating a suspicious link score for the first web page based on the set of direct links and the set of indirect links;
- classifying the first web page as suspicious based at least in part on the suspicious link score.

17. The system of claim 14, wherein:
the one or more classification algorithms comprise a set of classifiers;
the establishing module trains the classification model for identifying suspicious web pages by training the set of classifiers, wherein each classifier in the set of classifiers is configured to independently classify the first web page.

18. The system of claim 17, wherein the classification module classifies the first web page as suspicious using the classification model by:
- determining, for each classifier in the set of classifiers, a classification for the first web page;
- combining the classifications of each classifier in the set of classifiers.

19. The system of claim 18, wherein the updating module updates the one or more classification algorithms by:
- generating an additional classifier based at least in part on the first web page and the web-page link graph;
- adding the additional classifier to the set of classifiers.

20. A non-transitory computer-readable-storage medium comprising one or more computer-executable instructions that, when executed by a computing device, cause the computing device to:
- identify a plurality of malicious web pages;
- train a classification model for identifying suspicious web pages that comprises one or more classification algorithms using:
  - features of the plurality of malicious web pages;
  - features of a web-page link graph that comprises at least:
    - a plurality of nodes, wherein each node within the plurality of nodes represents one of the plurality of malicious web pages;
    - a plurality of edges that join the plurality of nodes and that represent links between web pages represented within the web-page link graph, wherein the one or more classification algorithms are configured to classify web pages as suspicious;
- identify a website after the classification model has been trained;
- classify a first web page of the website and a second web page of the website as suspicious using the classification model;
- determine that a probability of maliciousness of the first web page is greater than a probability of maliciousness of the second web page;
- in response to classifying the first web page and the second web page as suspicious and based at least in part on the probability of maliciousness of the first web page being greater than the probability of maliciousness of the second web page:
  - selectively apply heavy analysis to the first web page and the second web page in order to conserve system resources of a monitored computer environment by:
    - executing the first web page within the monitored computer environment to determine whether the first web page is malicious;
    - refraining from executing the second web page within the monitored computer environment to determine whether the second web page is malicious;
  - detect a malicious behavior of the first web page resulting from executing the first web page;
- classify the website as malicious based on detecting the malicious behavior;
- when the website is classified as malicious, update the classification model by updating the web-page link graph and the one or more classification algorithms based at least in part on the website having been classified as malicious.

* * * * *